Feb. 19, 1957  E. F. STALCUP  2,782,150
EVAPORATOR APPARATUS
Filed Oct. 23, 1953  3 Sheets-Sheet 1

INVENTOR
ERNEST F. STALCUP
BY
Ralph T. French
ATTORNEY

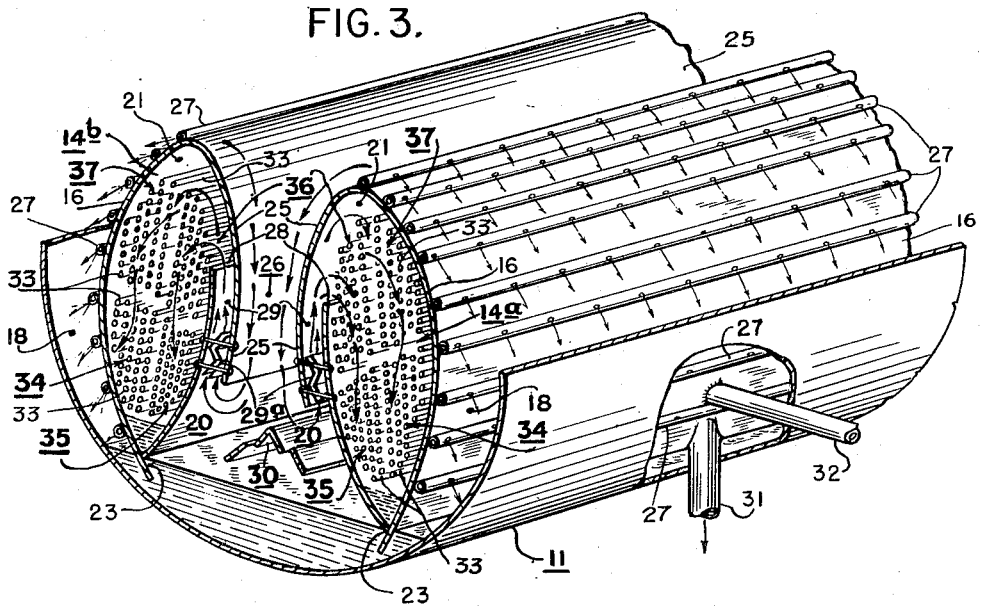
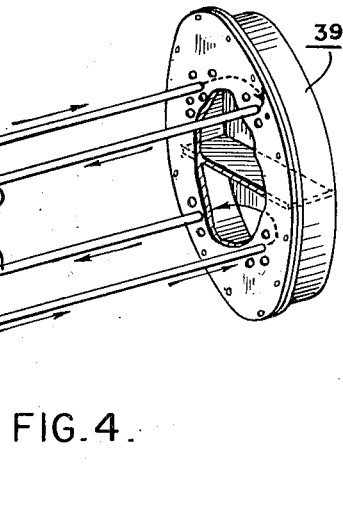

Feb. 19, 1957 E. F. STALCUP 2,782,150
EVAPORATOR APPARATUS
Filed Oct. 23, 1953 3 Sheets-Sheet 3

INVENTOR
ERNEST F. STALCUP
BY
ATTORNEY

United States Patent Office 2,782,150
Patented Feb. 19, 1957

2,782,150

EVAPORATOR APPARATUS

Ernest F. Stalcup, Lansdowne, Pa., assignor to Westinghouse Electric Corporation, East Pittsburgh, Pa., a corporation of Pennsylvania Application October 23, 1953, Serial No. 387,840

4 Claims. (Cl. 202—185)

This invention relates to flash evaporating and condensing systems and it has for an object to combine a flash evaporator and a condenser in a manner to provide a highly efficient and compact unit.

In the process of distilling sea water or polluted water to make potable water (or to make pure boiler feed water), it is necessary to condense the resultant vapor. Pressure losses in the usual piping between the evaporator and the condenser reduce the over-all efficiency of the system.

In view of the above, it is a further object of the invention to provide a structure in which the usual piping between the evaporator and the condenser is obviated.

Another object is to provide a self-contained structure of the above type in which the condensing structure is arranged in the flash evaporating structure without materially increasing the size of the shell.

To improve the taste of potable distilled water, it is desirable to cool and thoroughly aerate the condensate and retain in solution the maximum amount of oxygen. Accordingly, a more specific object of the invention is to provide, in the above construction, an arrangement whereby air off-take or removal means is provided in the coldest region of the condenser.

The above and other objects are effected by the invention as will be apparent from the following description taken in connection with the accompanying drawings, forming a part of this application, in which:

Fig. 3 is a fragmentary prospective view of the structure shown in Fig. 1;

Fig. 4 is a schematic view, in perspective, showing one of the condensers;

Figure 1:
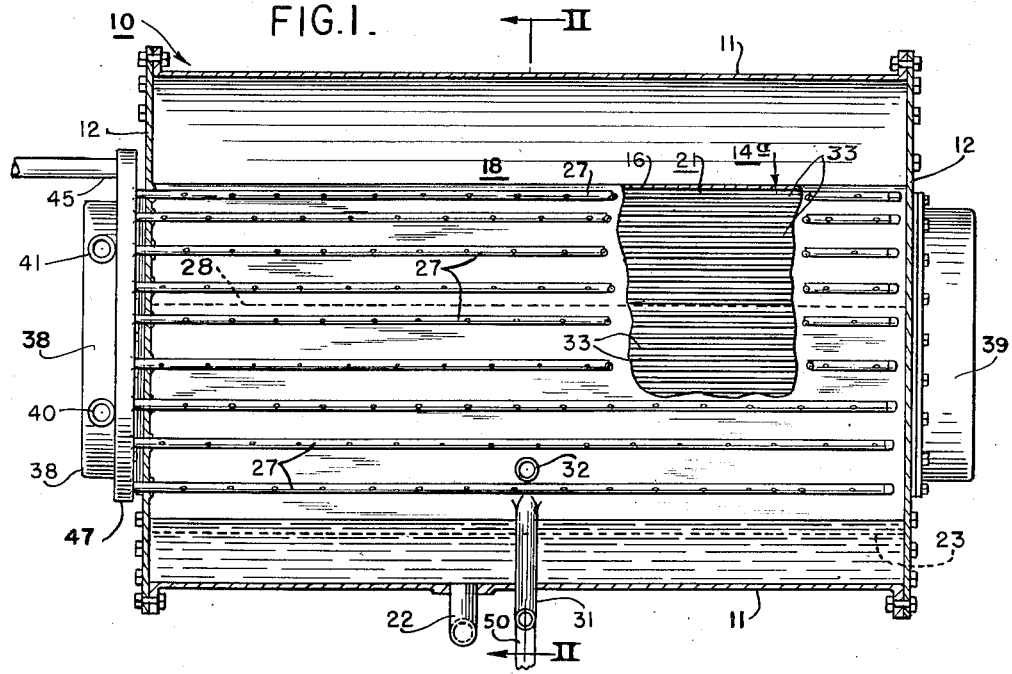
Fig. 1 is a side view, with the outer shell in section and other parts cut away for clarity, illustrating an embodiment of my invention.

Referring to Figs. 1 to 4 inclusive, of the drawings, there is shown a combined flash evaporator and condenser, generally indicated 10, having a common enclosure comprising a preferably cylindrical shell 11 and end plates 12 attached thereto.

The combined flash evaporator and condenser 10 includes a pair of flash evaporator portions generally indicated 13a and 13b, and a pair of condenser portions generally indicated 14a and 14b. The evaporator portions 13a and 13b are of the type disclosed and claimed in Touloukian Patent No. 2,548,081, assigned to the same assignee as the present invention, and include curved partition plates 16, 16 and 17, 17 which extend from end to end of the shell 11 and separate the interior of the shell into vaporizing sections 18, 18 and separating sections 20, 20. The regions confined by the partitions 16 and 17 provide vapor-collecting sections 21, 21 within which are received the condenser portions 14a and 14b.

The shell is provided with a water outlet 22 at the bottom thereof and arranged to maintain a desired normal water level in the shell and the partitions 16 have their lower edge portions 23, 23 submerged in the water so that the vaporizing and separating sections 18 and 20, respectively, are separated at their lower portions by a water seal.

The partitions 16 are curved upwardly to provide, with respect to the shell 11, upwardly diverging involute portions of the vaporizing sections 18 and are further provided with downwardly curved portions 25, 25 defining a vertical nozzle passage 26 extending from end to end of the shell and through which water vapor and air intermixed therewith flow from the vaporizing sections 18 to the separating sections 20.

Water at a temperature higher than that corresponding to the pressure in the shell is supplied through spray pipes 27, 27 distributed along the partitions 16, 16 and arranged to provide a relatively large evaporation surface, the spray pipes having spray openings arranged to discharge generally downwardly, as indicated.

The nozzle 26 extends downwardly into the separating spaces 20, 20 so that its discharge end is well below the upper edge portions 28, 28 of partition plates 17. The upper edge portions 28 are disposed inwardly of the curved portions 25 of partitions 16 and are arranged in overlapping spaced relation to each other, defining vertical passages 29, 29 affording communication between the separating sections 20 and the vapor-collecting sections 21. Thus, media discharging from the nozzle 26 and entering the separating sections must undergo a sharp reversal in direction before entering the vapor-collecting sections; and as the nozzle operates to accelerate the media to a suitably high velocity, water droplets entrained with the air and vapor are provided with kinetic energy resisting reversal of flow with the result that the droplets separate by centrifugal action and impinge upon and join the body of water at the bottom of the separating sections 20.

If desired, a pair of spaced baffles 29a of Z-shaped cross-section may be provided in the passages 29 and supported therein by a plurality of rivets or other suitable fastening means. These baffles extend from end to end of the shell and serve to remove water droplets which may still be entrained in the vapor. The droplets thus separated from the vapor stream fall from the baffles 29a and also join the body of water at the bottom of the sections 20.

To avoid direct and downward impingement of the nozzle discharge with the water at the bottom of the shell, there may, if desired, be provided a vapor deflector and drip drainer 30 extending from end to end of the shell. As shown, the deflector and drip drainer is of inverted V-form and the sides thereof have drainage openings for permitting water collected thereon to drain off, as more fully described and claimed in the above Touloukian patent.

Condensate outlet conduits 31, 31 are provided at the lower portions of the vapor-collecting sections 21, and immediately above the outlets 31 there are provided air off-take conduits 32, 32 which serve to remove air and other foreign gases from the vapor collected within the vapor-collecting sections and further serve to provide low absolute pressure within the vapor-collecting sections.

The condenser portions 14a and 14b are provided with a plurality of water-cooled tubes 33, disposed within the confines of the vapor-collecting sections 21.

In operation, it will be apparent that with water suitably withdrawn from the shell, with the air off-take conduits 32 connected to suitable low absolute pressure maintaining means, and with water supplied to the spray pipes at a temperature higher than that corresponding to the pressure maintained within the shell, a portion of the spray will be vaporized. As the spray is vaporized in the vaporizing sections 18, it is circulated upwardly and then downwardly through the nozzle 26, into the vapor-collecting sections 21 by means of the passages 29, and then circulates downwardly around the condenser tubes 33 and chilled thereby. Condensate formed within the vapor-collecting sections 21 drops to the bottom of the sections and may then be withdrawn through the condensate outlets 31, while air separated from the condensate is removed through the air off-take conduits 32.

The condenser portions 14a and 14b may be identical, hence only one will be described. The tubes 33 are arranged in four bundles or passes 34, 35, 36 and 37 and communicate with a pair of water boxes 38 and 39 attached to the end plates 12 of the shell. The water box 38 is provided with an inlet conduit 40 and an outlet conduit 41. As shown in Fig. 4, in which only one tube 33 of each pass is shown, the water boxes 38 and 39 are partitioned, in a well-known manner, to permit water admitted by the inlet conduit 40 to pass from one portion of the water box 38 through pass 34 hereinafter called the first pass, to water box 39, then through pass 35 hereinafter called the second pass, to another portion of water box 38, through pass 36, hereinafter called the third pass, back to water box 39 and finally through pass 37, hereinafter called the fourth pass, back to water box 38 and to the outlet conduit 41.

Figure 2:
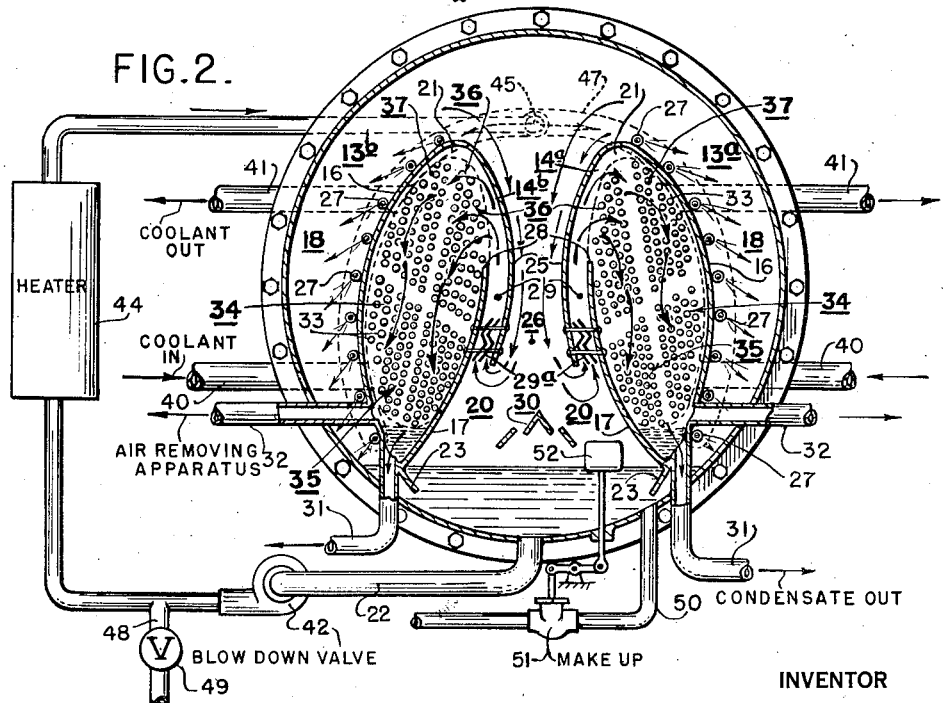
Fig. 2 is a cross-section taken on line II—II of Fig. 1.

As shown by the directional arrows, the vapor flows upwardly upon entering the vapor-collecting section 21 and then reverses direction and sweeps downwardly past the third and fourth passes 36 and 37, respectively, and then past the cooler first and second passes 34 and 35, respectively. It must be pointed out that the first water pass 34 is arranged adjacent the air off-take conduit 32, as best shown in Fig. 2. With this arrangement, the air taken off from the vapor-collecting section 21 is assured of being cooled to the lowest degree. Hence, the condensate retains in solution the maximum amount of oxygen which, as generally known, improves the taste of water when used for human consumption. It will also be noted that the second water pass 35 is disposed adjacent the first pass 34 and that both the first and second passes mentioned above, which are the cooler of the four passes, are disposed immediately adjacent the condensate outlet 31. With this arrangement, condensate dropping through the condenser portion is cooled to the lowest degree, thereby further enhancing the taste qualities of the water when used for human consumption.

As shown in the previously mentioned Touloukian patent, water may be supplied to and withdrawn from the shell 11 in any suitable manner so long as the temperature of the water is above that corresponding to the pressure maintained within the shell. By way of example, in Fig. 2, a pump 42 withdraws water from the outlet 22 and passes it through a heater 44 from which it is discharged to the inlet 45 of a manifold 47 with which the spray pipes 27 are in communication. If such an arrangement for circulation is used, provision could be made for periodic blow-down to avoid undue concentration of salts in the spray water. Accordingly, a blow-down connection 48 provided with a valve 49, and a makeup connection 50 having a valve 51 which is opened by a float 52 when the water level at the bottom of the shell falls a predetermined amount, may be provided. Upon opening of the blow-down valve 49, water withdrawn from the shell by the pump 42 is discharged and, as the water level falls, the float operates to open the makeup valve 51 and supplies additional makeup water to the interior of the shell.

Figure 5:
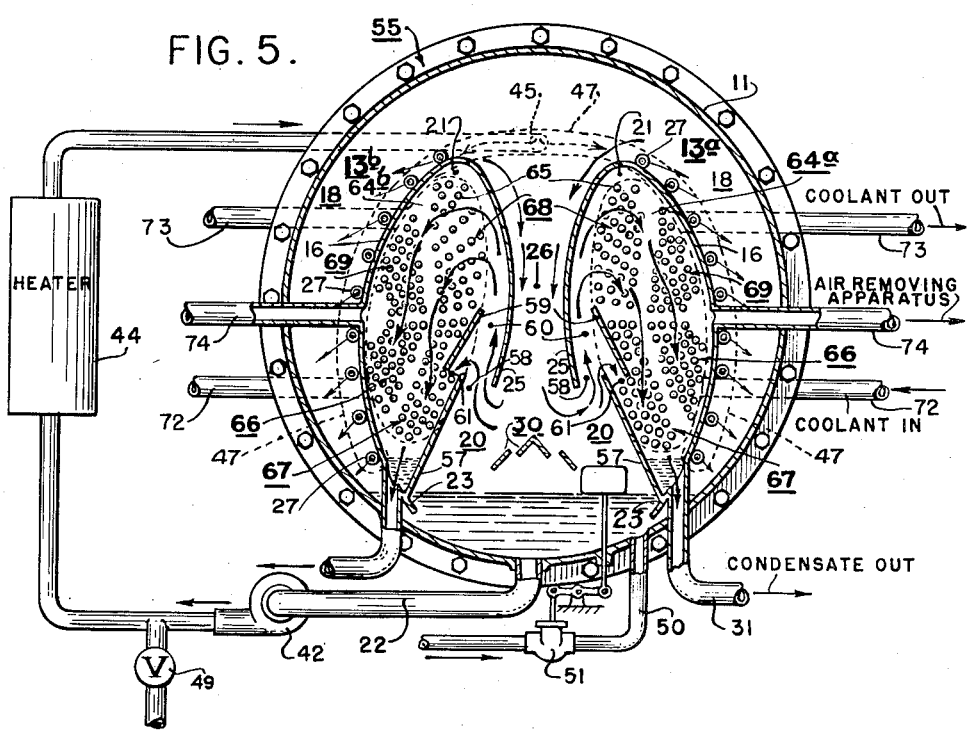
Fig. 5 is a view similar to Fig. 2, but showing another embodiment of the invention.
Figure 6:
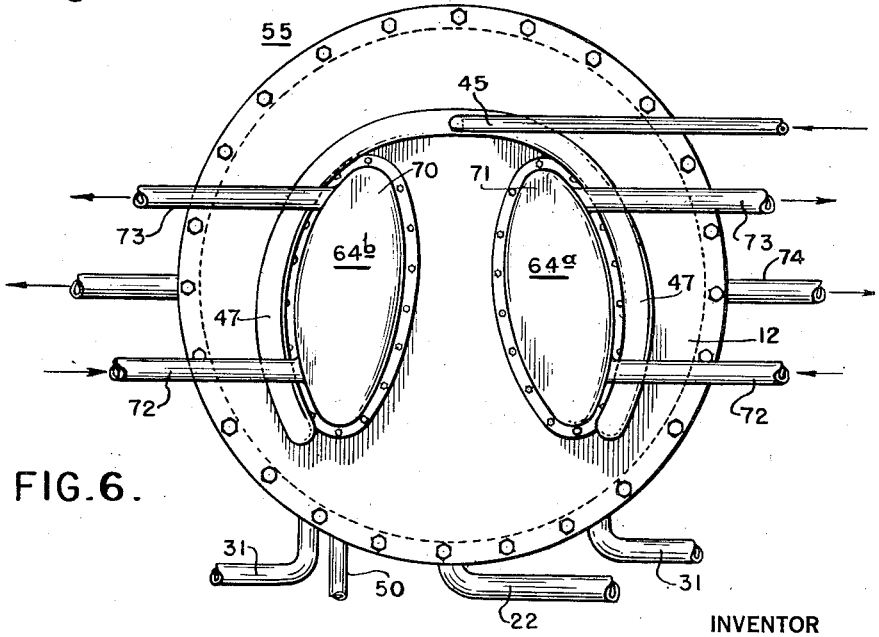
Fig. 6 is an end view of the embodiment shown in Fig. 5.

*Embodiment shown in Figs. 5 and 6*

In Figs. 5 and 6, there is shown a modified combined flash evaporator and condenser structure, generally indicated 55, suitable for preparation of boiler feed water. As well understood in the art, it is desirable to remove as much as possible of the air, oxygen and other gases from the water prior to its introduction into a boiler or the like.

The evaporator portions 13a and 13b may be formed in the same manner as those described previously in connection with the first embodiment and are provided with partition plates 16, 16 forming vaporizing sections 18, 18 and a centrally disposed vertically extending nozzle 26. Partition plates 57, 57 attached at the lower ends of the partitions 16 extend upwardly into slightly lapped and spaced relation with the portions 25 of the partition plates 16, 16 thereby forming passages 58, 58 connecting the separating sections 20 with the vapor-collecting sections 21.

Baffle plates 59, 59 are provided within the vapor-collecting sections 21 and are disposed in spaced and slightly overlapping relation with the partitions 57 and the portions 25 of the partitions 16, thereby defining upper passages 60, 60 and lower passages 61, 61.

The condenser portions 64a and 64b are provided with a plurality of water cooled tubes 65, disposed within the confines of the vapor-collecting sections 21, 21. Here again, the condenser portions 64a and 64b may be identical, hence, only one need be described. The tubes 65 are arranged in four bundles or passes 66, 67, 68 and 69 and communicate with a pair of water boxes 70 and 71 attached to the end plates 12 of the shell 11. The water box 70 is provided with an inlet conduit 72 and an outlet conduit 73 providing coolant for the tube passes 66, 67, 68 and 69. Although the water boxes 70 and 71 are not shown in detail, they may be partitioned in the same manner as the water boxes shown in Fig. 4 to permit water admitted by the inlet conduit 72 to pass successively through first, second, third and fourth passes 66, 67, 68 and 69, respectively.

An air off-take conduit 74 is provided remote from and above each condensate outlet conduit 31. The air off-take conduit is disposed adjacent the first and fourth passes 66 and 69, respectively. It will be noted that the baffle 59 is disposed opposite the air off-take conduit 74 and serves to direct the incoming vapor stream by two oppositely directed paths, shown by the arrows, past the tubes 65.

In operation, the structure 55 operates generally in the same manner as structure 10. That is, vapor formed in the vaporizing sections 18 circulates upwardly and then downwardly through the nozzle 26 where it is deflected by the deflecting member 30 and reverses its direction sharply before entering the passages 58. Water droplets entrained therein are thrown out of the vapor stream on to the body of water provided in the lower portion of the shell while the vapor flows into the vapor-collecting sections 21. However, in this embodiment, each of the baffles 59 causes the vapor stream flowing therepast to divide so that some of the vapor flows downwardly through passage 61 underneath and into the second pass 67 and first pass 66, while the remainder of the vapor stream flows upwardly and then downwardly into the third and fourth passes 68 and 69. The condensate formed within the vapor-collecting sections 21 drops to the bottom of the same, where it may be discharged from the condensate outlets 31. Air and other foreign gases are withdrawn through the air off-take conduits 74.

It will be noted that in this arrangement only a portion of the vapor sweeps past tube passes 68 and 69. That portion of the vapor which flows downwardly underneath and into the second and first passes 67 and 66 first functions to heat the falling condensate from all the tubes so that the ability of the condensate to hold air and other foreign gases in suspension or solution is reduced. This allows the air and gases which are non-condensible to disassociate and flow upwardly toward the air off-take conduit 74.

It will now be seen that in this embodiment the condensate is extracted at or near the saturated vapor temperature thus reducing the heat consumption required to prepare it for boiler feed water. Also, since the condensate formed within the vapor-collecting sections 21 is at a higher temperature, considerably less oxygen is maintained in solution by the condensate. Stated another way, more air is extracted in this embodiment than the first embodiment so that the condensate is substantially oxygen-free.

From the above, it will be apparent that the invention provides a structure in which a complete process of vaporizing water, extracting solids therefrom, collecting and condensing the vapor, and de-aeration of the vapor may be effected within a common confining shell structure. A highly efficient and compact unitary arrangement is thus provided which is less expensive to manufacture, ship and install. Also, since the vapor is condensed and de-aerated within the shell structure, external piping heretofore deemed necessary is substantially reduced and the attendant piping losses are thereby reduced, with resulting economical operation.

While the invention has been shown in several forms, it will be obvious to those skilled in the art that it is not so limited, but is susceptible of various other changes and modifications without departing from the spirit thereof.

What is claimed is:

1. In combination, a flash evaporator comprising a tubular shell structure, a pair of curved partition structures disposed within said shell structure in mutually spaced relation with each other and forming a pair of vapor-collecting sections, said partition structures together with said shell structure defining a pair of vaporizing sections, means for spraying heated liquid into said vaporizing sections, said partition structures further jointly defining a central vertical passageway communicating with said vaporizing sections at its upper end and with said vapor-collecting sections at its lower end, means disposed adjacent the lower end of said passageway for separating entrained liquid from vapor, vapor-condensing means including a plurality of tubes disposed in each of said vapor-collecting sections, condensate offtake conduit means extending through said shell and communicating with the lower portions of each of said vapor-collecting sections, and conduit means extending through said shell and communicating with each of said vapor-collecting sections above said condensate offtake conduit means for removing air therefrom.

2. The structure recited in claim 1 in which each of the partition structures is provided with inner and outer adjacent overlapping portions forming individual upwardly-extending passages connecting the central passageway with each of the vapor-collecting sections, whereby vapor undergoes an abrupt reversal in direction as it flows from the central passageway into said individual passages.

3. The structure recited in claim 2 in which the condensing tubes in each vaporizing section are arranged in a plurality of passes including a first tube pass and a subsequent tube pass, and in which means is provided adjacent the individual passages for diverting a portion of the vapor streams away from the upper regions of the vapor-collecting sections, the air-removing conduit means being in direct communication with said upper regions, each said first tube pass being disposed between the air-removing conduit means and the condensate offtake conduit means and each said subsequent tube pass being disposed in the associated upper region.

4. The structure recited in claim 2 in which the condensing tubes in each vaporizing section are arranged in a plurality of passes including a first tube pass and a subsequent tube pass, the air-removing conduit means is in direct communication with the lower regions of the vaporizing sections, each said first tube pass being disposed adjacent the air-removing conduit means and each said subsequent tube pass being disposed in the upper region of the associated vaporizing section.

References Cited in the file of this patent

UNITED STATES PATENTS

| 387,406 | Foley | Aug. 7, 1888 |
|---|---|---|
| 1,796,708 | Grace | Mar. 17, 1931 |
| 1,921,850 | Voorhees | Aug. 8, 1933 |
| 2,224,621 | Voorhees | Dec. 10, 1940 |
| 2,299,110 | Richards | Oct. 20, 1942 |
| 2,352,069 | Beline | June 20, 1944 |
| 2,372,846 | Nettel et al. | Apr. 3, 1945 |
| 2,383,945 | Shantz | Sept. 4, 1945 |
| 2,548,081 | Touloukian | Apr. 10, 1951 |
| 2,562,484 | Cross | July 31, 1951 |
| 2,575,051 | Egger et al. | Nov. 13, 1951 |
| 2,614,816 | Hull | Oct. 21, 1952 |
| 2,663,547 | Evans et al. | Dec. 22, 1953 |

FOREIGN PATENTS

| 415,524 | Germany | June 23, 1925 |
|---|---|---|
| 977,304 | France | Nov. 8, 1950 |